US012125440B2

(12) United States Patent
Kim et al.

(10) Patent No.: US 12,125,440 B2
(45) Date of Patent: Oct. 22, 2024

(54) DISPLAY DEVICE

(71) Applicant: LG ELECTRONICS INC., Seoul (KR)

(72) Inventors: Taehyun Kim, Seoul (KR); Changsu Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/149,384

(22) Filed: Jan. 3, 2023

(65) Prior Publication Data

US 2023/0267887 A1 Aug. 24, 2023

Related U.S. Application Data

(63) Continuation of application No. 17/660,594, filed on Apr. 25, 2022, now Pat. No. 11,545,090.

(30) Foreign Application Priority Data

Feb. 23, 2022 (KR) ........................ 10-2022-0023535

(51) Int. Cl.
*G09G 3/3233* (2016.01)

(52) U.S. Cl.
CPC ..... *G09G 3/3233* (2013.01); *G09G 2320/046* (2013.01)

(58) Field of Classification Search
CPC ........................ G09G 3/3233; G09G 2320/046
See application file for complete search history.

(56) References Cited

U.S. PATENT DOCUMENTS 11,182,467 B1 * 11/2021 Medina .................. G06F 3/147
11,545,090 B1 1/2023 Kim et al.
2010/0103198 A1 * 4/2010 Polak ...................... G09G 3/30 345/690
2012/0044270 A1 2/2012 Arkhipov et al.
2012/0162280 A1 6/2012 Yamashita et al.
(Continued)

FOREIGN PATENT DOCUMENTS

KR 10-2017-0080890 7/2017
KR 10-2018-0040286 4/2018
(Continued)

OTHER PUBLICATIONS

European Patent Office Application Serial No. 22166976.5, Search Report dated Sep. 1, 2022, 9 pages.
(Continued)

*Primary Examiner* — Jeff Piziali
(74) *Attorney, Agent, or Firm* — LEE, HONG, DEGERMAN, KANG & WAIMEY

(57) ABSTRACT

An organic light emitting diode display device calculates a cumulative current of each of the plurality of pixels, calculates a consumed current consumed by each of the plurality of pixels during a reproduction period of the image, estimates an expected deterioration time of each of the pixels based on a difference between the cumulative current and the consumed current, and operates the display unit in a normal output mode as an image output mode when a number of pixels expected to burn in among the plurality of pixels based on the estimated expected deterioration time is less than a preset number.

18 Claims, 12 Drawing Sheets

(56) References Cited

U.S. PATENT DOCUMENTS

| | | | | |
|---|---|---|---|---|
| 2013/0176324 | A1 | 7/2013 | Yamashita et al. | |
| 2014/0104258 | A1 | 4/2014 | Oh et al. | |
| 2014/0104259 | A1 | 4/2014 | Oh et al. | |
| 2014/0160142 | A1 | 6/2014 | Lee et al. | |
| 2014/0198091 | A1 | 7/2014 | Shin et al. | |
| 2014/0368556 | A1 | 12/2014 | Funatsu et al. | |
| 2017/0330502 | A1 | 11/2017 | Jang | |
| 2018/0102080 | A1 | 4/2018 | Kim et al. | |
| 2018/0226045 | A1 | 8/2018 | Sohn et al. | |
| 2020/0027377 | A1 | 1/2020 | Kobayashi | |
| 2020/0105223 | A1 | 4/2020 | Ishihara | |
| 2020/0372860 | A1* | 11/2020 | Kim | H04N 5/57 |
| 2021/0271508 | A1 | 9/2021 | Lee et al. | |
| 2021/0383155 | A1* | 12/2021 | Krüger | G09G 3/20 |
| 2022/0157234 | A1* | 5/2022 | Kim | G09G 3/3208 |
| 2022/0164061 | A1* | 5/2022 | Lim | G06F 3/0416 |
| 2022/0254307 | A1 | 8/2022 | Jeong | |
| 2023/0101814 | A1* | 3/2023 | Knock | G06Q 20/3827 386/223 |
| 2023/0155831 | A1* | 5/2023 | Lopez | H04L 9/3213 713/189 |

FOREIGN PATENT DOCUMENTS

| | | |
|---|---|---|
| KR | 10-2018-0092000 | 8/2018 |
| KR | 10-2019-0017273 | 2/2019 |
| KR | 10-2021-0111066 | 9/2021 |
| KR | 10-2021-0138784 | 11/2021 |

OTHER PUBLICATIONS

Korean Intellectual Property Office Application No. 10-2022-0023535, Office Action dated Jul. 30, 2023, 2 pages.

* cited by examiner

1000

| RGB data value x reproduction time of NFT content | Consumed current (mA) |
|---|---|
| 1000 | 0.1 |
| 2000 | 0.2 |
| 3000 | 0.3 |
| 4000 | 0.4 |
| 5000 | 0.5 |

1100

| Difference between cumulative estimated current and reference consumed current (mA) | Expected deterioration time of pixel (hour) |
|---|---|
| 100 | 10 |
| 200 | 20 |
| 300 | 30 |

DISPLAY DEVICE

CROSS-REFERENCE TO RELATED APPLICATIONS

This application is a continuation of U.S. patent application Ser. No. 17/660,594, filed on Apr. 25, 2022, which claims the benefit of earlier filing date and right of priority to Korean Patent Application No. 10-2022-0023535, filed on Feb. 23, 2022, the contents of which are all hereby incorporated by reference herein in their entirety.

BACKGROUND OF THE INVENTION

1. Field of the Invention

The present disclosure relates to a display device, and more particularly, to an organic light emitting diode display device.

2. Discussion of the Related Art

Recently, various types of display devices have been provided. Among them, an organic light emitting diode display device (hereinafter referred to as "OLED display device") is frequently used.

The OLED display device is a display device using organic light emitting elements. Since the organic light emitting elements are self-light-emitting elements, the OLED display device has advantages of being fabricated to have lower power consumption and be thinner than a liquid crystal display device requiring a backlight. In addition, the OLED display device has advantages such as a wide viewing angle and a fast response speed.

Non-fungible token (NFT) is a virtual asset that cannot replace a blockchain token with other tokens. NFT is used as a means for recording the copyright and ownership of digital assets such as games and artworks in a blockchain-based distributed network.

NFT art gallery is a platform service that allows users to enjoy and trade various media and contents such as art, design, sports, and games on an OLED TV. If a still image is reproduced for a long time, a burn-in effect may appear.

SUMMARY OF THE INVENTION

An object of the present disclosure is to provide an OLED display device capable of preventing burn-in during image reproduction.

According to an embodiment of the present disclosure, an organic light emitting diode display device may calculate a cumulative current of each of the plurality of pixels, may calculate a consumed current consumed by each of the plurality of pixels during a reproduction period of the image, may estimate an expected deterioration time of each of the pixels based on a difference between the cumulative current and the consumed current, and may operate the display unit in a normal output mode as an image output mode when a number of pixels expected to burn in among the plurality of pixels based on the estimated expected deterioration time is less than a preset number.

According to an embodiment of the present disclosure, burn-in of pixels during image reproduction may be efficiently prevented. Accordingly, the lifespan of the display device may be increased, and the user does not feel discomfort due to burn-in when the user views an image.

DETAILED DESCRIPTION OF THE PREFERRED EMBODIMENTS

Hereinafter, the present disclosure will be described in more detail with reference to the drawings.

Figure 1:
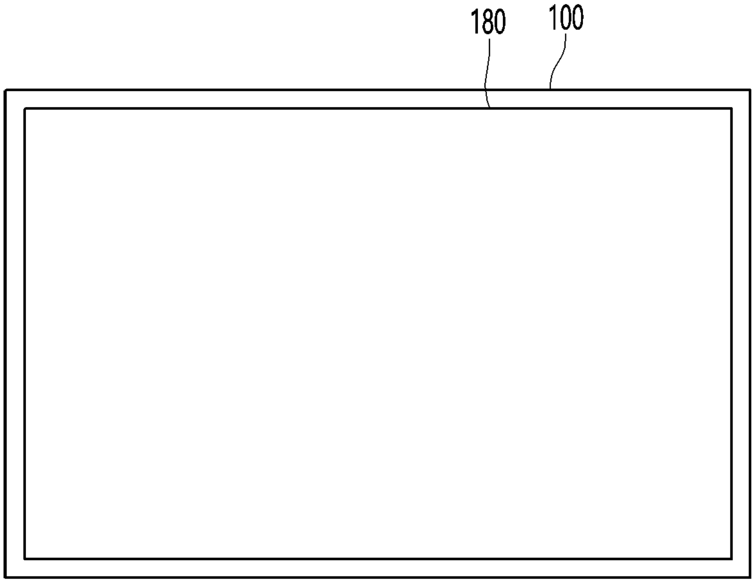
FIG. 1 is a diagram illustrating a display device according to an embodiment of the present disclosure.

FIG. 1 is a diagram illustrating a display device according to an embodiment of the present disclosure.

Referring to the drawings, a display device 100 may include a display unit 180.

Meanwhile, the display unit 180 may be implemented with any one of various panels. For example, the display unit 180 may be any one of a liquid crystal display panel (LCD panel), an organic light emitting diode panel (OLED panel), and an inorganic light emitting diode panel (LED panel).

In the present disclosure, it is assumed that the display unit 180 includes an organic light emitting diode panel (OLED panel). It should be noted that this is only exemplary, and the display unit 180 may include a panel other than an organic light emitting diode panel (OLED panel).

Meanwhile, the display device 100 of FIG. 1 may be a monitor, a TV, a tablet PC, or a mobile terminal.

Figure 2:
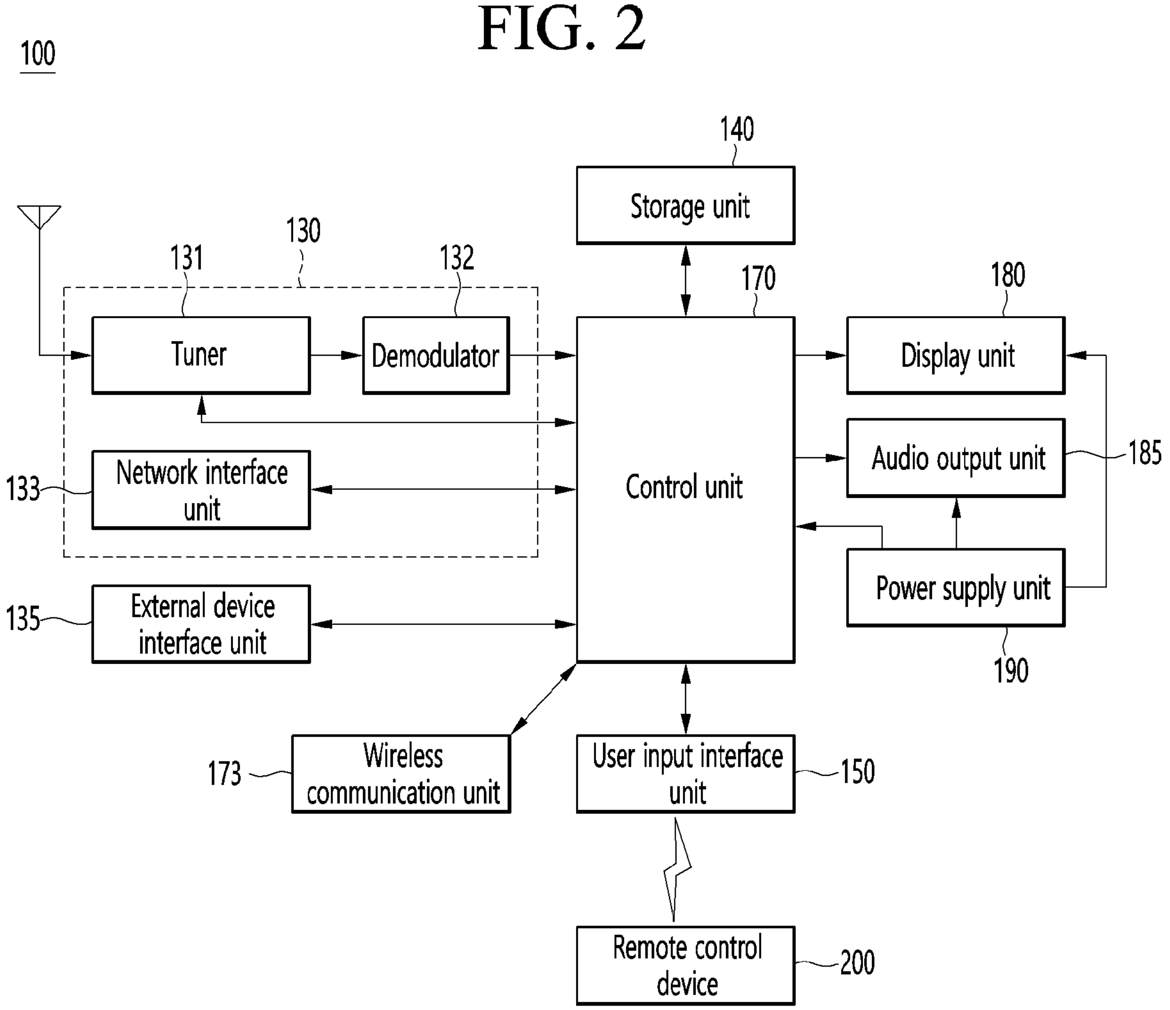
FIG. 2 is a block diagram illustrating a configuration of the display device of FIG. 1.

FIG. 2 is a block diagram showing a configuration of the display device of FIG. 1.

Referring to FIG. 2, the display device 100 may include a broadcast receiving unit 130, an external device interface unit 135, a storage unit 140, a user input interface unit 150, a control unit 170, and a wireless communication unit 173, a display unit 180, an audio output unit 185, and a power supply unit 190.

The broadcast receiving unit 130 may include a tuner 131, a demodulator 132, and a network interface unit 133.

The tuner 131 may select a specific broadcast channel according to a channel selection command. The tuner 131 may receive a broadcast signal for the selected specific broadcast channel.

The demodulator 132 may separate the received broadcast signal into a video signal, an audio signal, and a data signal related to a broadcast program, and restore the separated video signal, audio signal, and data signal to a format capable of being output.

The network interface unit 133 may provide an interface for connecting the display device 100 to a wired/wireless network including an Internet network. The network interface unit 133 may transmit or receive data to or from other users or other electronic devices through a connected network or another network linked to the connected network.

The network interface unit 133 may access a predetermined web page through the connected network or the other network linked to the connected network. That is, it is possible to access a predetermined web page through a network, and transmit or receive data to or from a corresponding server.

In addition, the network interface unit 133 may receive content or data provided by a content provider or a network operator. That is, the network interface unit 133 may receive content such as a movie, advertisement, game, VOD, broadcast signal, and related information provided by a content provider or a network provider through a network.

In addition, the network interface unit 133 may receive update information and update files of firmware provided by the network operator, and may transmit data to an Internet or content provider or a network operator.

The network interface unit 133 may select and receive a desired application from among applications that are open to the public through a network.

The external device interface unit 135 may receive an application or a list of applications in an external device adjacent thereto, and transmit the same to the control unit 170 or the storage unit 140.

The external device interface unit 135 may provide a connection path between the display device 100 and the external device. The external device interface unit 135 may receive one or more of video and audio output from an external device wirelessly or wired to the display device 100 and transmit the same to the control unit 170. The external device interface unit 135 may include a plurality of external input terminals. The plurality of external input terminals may include an RGB terminal, one or more High Definition Multimedia Interface (HDMI) terminals, and a component terminal.

The video signal of the external device input through the external device interface unit 135 may be output through the display unit 180. The audio signal of the external device input through the external device interface unit 135 may be output through the audio output unit 185.

The external device connectable to the external device interface unit 135 may be any one of a set-top box, a Blu-ray player, a DVD player, a game machine, a sound bar, a smartphone, a PC, a USB memory, and a home theater, but this is only an example.

In addition, a part of content data stored in the display device 100 may be transmitted to a selected user among a selected user or a selected electronic device among other users or other electronic devices registered in advance in the display device 100.

The storage unit 140 may store programs for signal processing and control of the control unit 170, and may store video, audio, or data signals, which have been subjected to signal-processed.

In addition, the storage unit 140 may perform a function for temporarily storing video, audio, or data signals input from an external device interface unit 135 or the network interface unit 133, and store information on a predetermined video through a channel storage function.

The storage unit 140 may store an application or a list of applications input from the external device interface unit 135 or the network interface unit 133.

The display device 100 may play back a content file (a moving image file, a still image file, a music file, a document file, an application file, or the like) stored in the storage unit 140 and provide the same to the user.

The user input interface unit 150 may transmit a signal input by the user to the control unit 170 or a signal from the control unit 170 to the user. For example, the user input interface unit 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the control unit 170 to the remote control device 200.

In addition, the user input interface unit 150 may transmit a control signal input from a local key (not shown) such as a power key, a channel key, a volume key, and a setting value to the control unit 170.

The video signal image-processed by the control unit 170 may be input to the display unit 180 and displayed with video corresponding to a corresponding video signal. Also, the video signal image-processed by the control unit 170 may be input to an external output device through the external device interface unit 135.

The audio signal processed by the control unit 170 may be output to the audio output unit 185. Also, the audio signal processed by the control unit 170 may be input to the external output device through the external device interface unit 135.

In addition, the control unit 170 may control the overall operation of the display device 100.

In addition, the control unit 170 may control the display device 100 by a user command input through the user input interface unit 150 or an internal program and connect to a network to download an application a list of applications or applications desired by the user to the display device 100.

The control unit 170 may allow the channel information or the like selected by the user to be output through the display unit 180 or the audio output unit 185 along with the processed video or audio signal.

In addition, the control unit 170 may output a video signal or an audio signal through the display unit 180 or the audio output unit 185, according to a command for playing back a video of an external device through the user input interface unit 150, the video signal or the audio signal being input from an external device, for example, a camera or a camcorder, through the external device interface unit 135.

Meanwhile, the control unit 170 may allow the display unit 180 to display a video, for example, allow a broadcast video which is input through the tuner 131 or an external input video which is input through the external device interface unit 135, a video which is input through the network interface unit or a video which is stored in the storage unit 140 to be displayed on the display unit 180. In this case, the video displayed on the display unit 180 may be a still image or a moving image, and may be a 2D image or a 3D image.

In addition, the control unit 170 may allow content stored in the display device 100, received broadcast content, or external input content input from the outside to be played back, and the content may have various forms such as a broadcast video, an external input video, an audio file, still images, accessed web screens, and document files.

The wireless communication unit 173 may communicate with an external device through wired or wireless communication. The wireless communication unit 173 may perform short range communication with an external device. To this end, the wireless communication unit 173 may support short range communication using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication unit 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication unit 173 may detect (or recognize) a wearable device capable of communication around the display device 100. Furthermore, when the detected wearable device is an authenticated device to communicate with the display device 100 according to the present disclosure, the control unit 170 may transmit at least a portion of data processed by the display device 100 to the wearable device through the wireless communication unit 173. Therefore, a user of the wearable device may use data processed by the display device 100 through the wearable device.

The display unit 180 may convert a video signals, data signal, or OSD signal processed by the control unit 170, or a video signal or data signal received from the external device interface unit 135 into R, G, and B signals, and generate drive signals.

Meanwhile, the display device 100 illustrated in FIG. 2 is only an embodiment of the present disclosure, and therefore, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 2, the display device 100 may receive a video through the network interface unit 133 or the external device interface unit 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 2 and but also one of an image processing device such as the separated set-top box and a content playback device including the display unit 180 the audio output unit 185.

The audio output unit 185 may receive a signal audio-processed by the control unit 170 and output the same with audio.

The power supply unit 190 may supply corresponding power to the display device 100. Particularly, power may be supplied to the control unit 170 that may be implemented in the form of a system on chip (SOC), the display unit 180 for video display, and the audio output unit 185 for audio output.

Specifically, the power supply unit 190 may include a converter that converts AC power into DC power, and a dc/dc converter that converts a level of DC power.

The remote control device 200 may transmit a user input to the user input interface unit 150. To this end, the remote control device 200 may use Bluetooth, Radio Frequency (RF) communication, Infrared (IR) communication, Ultra Wideband (UWB), ZigBee, or the like. In addition, the remote control device 200 may receive a video, audio, or data signal or the like output from the user input interface unit 150, and display or output the same through the remote control device 200 by video or audio.

Figure 3:
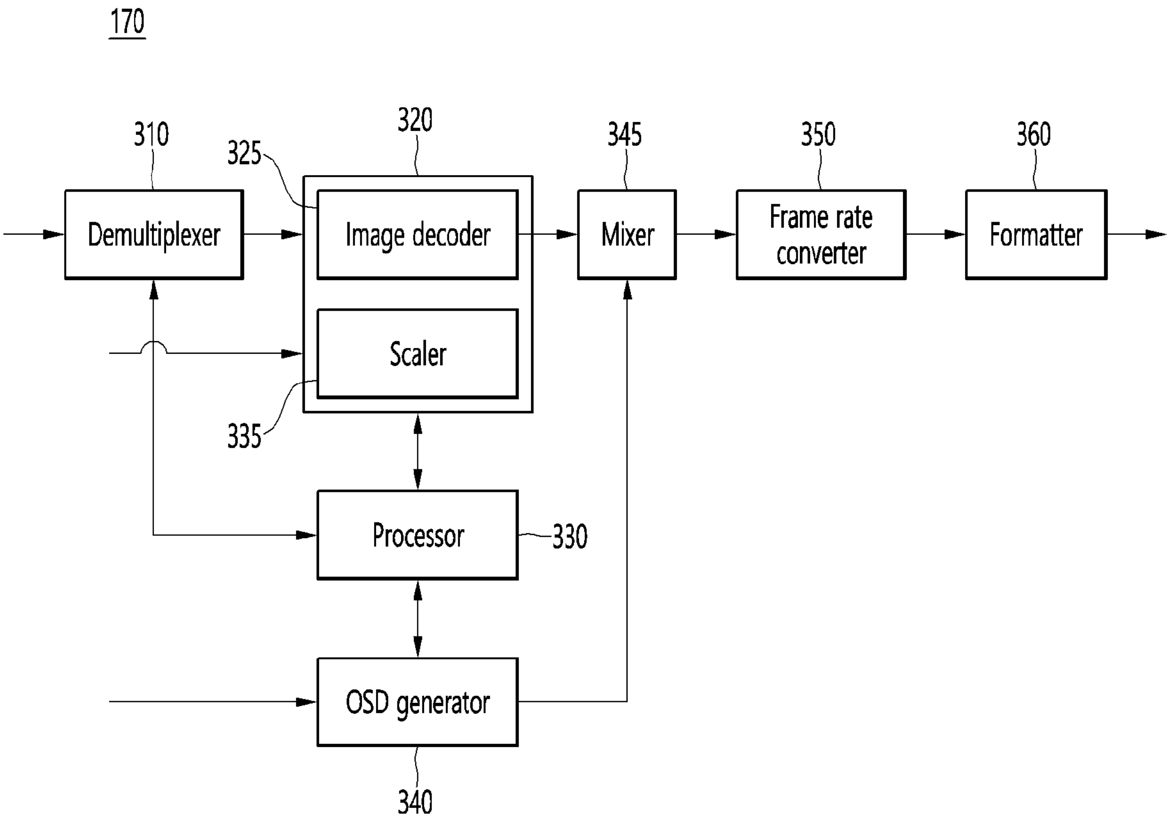
FIG. 3 is an example of an internal block diagram of a control unit of FIG. 2.

FIG. 3 is an example of an internal block diagram of the controller of FIG. 2.

Referring to the drawings, the control unit 170 according to an embodiment of the present disclosure may include a demultiplexer 310, an image processing unit 320, a processor 330, an OSD generator 340, a mixer 345, a frame rate converter 350, and a formatter 360. In addition, an audio processing unit (not shown) and a data processing unit (not shown) may be further included.

The demultiplexer 310 may demultiplex input stream. For example, when MPEG-2 TS is input, the demultiplexer 310 may demultiplex the MPEG-2 TS to separate the MPEG-2 TS into video, audio, and data signals. Here, the stream signal input to the demultiplexer 310 may be a stream signal output from the tuner 131, the demodulator 132 or the external device interface unit 135.

The image processing unit 320 may perform image processing on the demultiplexed video signal. To this end, the image processing unit 320 may include an image decoder 325 and a scaler 335.

The image decoder 325 may decode the demultiplexed video signal, and the scaler 335 may scale a resolution of the decoded video signal to be output through the display unit 180.

The video decoder 325 may be provided with decoders of various standards. For example, an MPEG-2, H.264 decoder, a 3D video decoder for color images and depth images, and a decoder for multi-view images may be provided.

The processor 330 may control the overall operation of the display device 100 or of the control unit 170. For example, the processor 330 may control the tuner 131 to select (tune) an RF broadcast corresponding to a channel selected by a user or a pre-stored channel.

In addition, the processor 330 may control the display device 100 by a user command input through the user input interface unit 150 or an internal program.

In addition, the processor 330 may perform data transmission control with the network interface unit 135 or the external device interface unit 135.

In addition, the processor 330 may control operations of the demultiplexer 310, the image processing unit 320, and the OSD generator 340 in the control unit 170.

The OSD generator 340 may generate an OSD signal according to a user input or by itself. For example, based on a user input signal, a signal for displaying various information on a screen of the display unit 180 as a graphic or text may be generated. The generated OSD signal may include various data such as a user interface screen, various menu screens, widgets, and icons of the display device 100. In addition, the generated OSD signal may include a 2D object or a 3D object.

In addition, the OSD generator 340 may generate a pointer that may be displayed on the display unit 180 based on a pointing signal input from the remote control device 200. In particular, such a pointer may be generated by the pointing signal processing unit, and the OSD generator 340 may include such a pointing signal processing unit (not shown). Of course, the pointing signal processing unit (not shown) may be provided separately, not be provided in the OSD generator 340

The mixer 345 may mix the OSD signal generated by the OSD generator 340 and the decoded video signal image-processed by the image processing unit 320. The mixed video signal may be provided to the frame rate converter 350.

The frame rate converter (FRC) 350 may convert a frame rate of an input video. On the other hand, the frame rate converter 350 may output the input video as it is, without a separate frame rate conversion.

On the other hand, the formatter 360 may change the format of the input video signal into a video signal to be displayed on the display and output the same.

The formatter 360 may change the format of the video signal. For example, it is possible to change the format of the 3D video signal to any one of various 3D formats such as a side by side format, a top/down format, a frame sequential format, an interlaced format, a checker box and the like.

Meanwhile, the audio processing unit (not shown) in the control unit 170 may perform audio processing of a demultiplexed audio signal. To this end, the audio processing unit (not shown) may include various decoders.

In addition, the audio processing unit (not shown) in the control unit 170 may process a base, treble, volume control, and the like.

The data processing unit (not shown) in the control unit 170 may perform data processing of the demultiplexed data signal. For example, when the demultiplexed data signal is an encoded data signal, the demultiplexed data signal may be decoded. The coded data signal may be electronic program guide information including broadcast information such as a start time and an end time of a broadcast program broadcast on each channel.

Meanwhile, a block diagram of the control unit 170 illustrated in FIG. 3 is a block diagram for an embodiment of the present disclosure. The components of the block diagram may be integrated, added, or omitted depending on the specification of the control unit 170 that is actually implemented.

In particular, the frame rate converter 350 and the formatter 360 may not be provided in the control unit 170, and may be separately provided or separately provided as a single module.

Figure 4A:
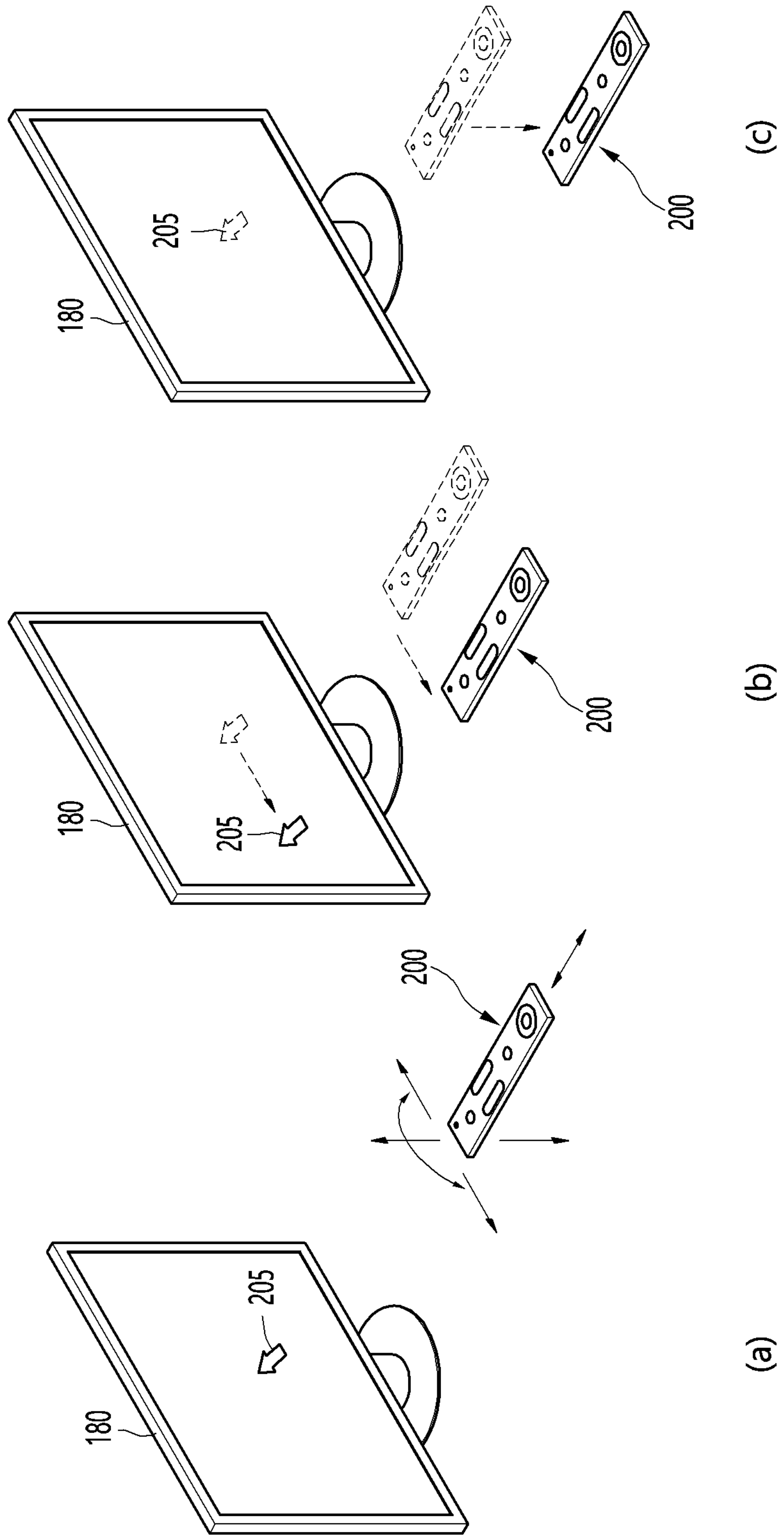
FIG. 4A is a diagram illustrating a control method for a remote control device of FIG. 2.

FIG. 4A is a diagram illustrating a control method for a remote control device of FIG. 2.

In (a) of FIG. 4A, it is illustrated that a pointer 205 corresponding to the remote control device 200 is displayed on the display unit 180.

The user may move or rotate the remote control device 200 up and down, left and right (FIG. 4A (b)), and forward and backward ((c) of FIG. 4A). The pointer 205 displayed on the display unit 180 of the display device may correspond to the movement of the remote control device 200. The remote control device 200 may be referred to as a spatial remote controller or a 3D pointing device, as the corresponding pointer 205 is moved and displayed according to the movement on a 3D space, as shown in the drawing.

In (b) of FIG. 4A, it is illustrated that that when the user moves the remote control device 200 to the left, the pointer 205 displayed on the display unit 180 of the display device moves to the left correspondingly.

Information on the movement of the remote control device 200 detected through a sensor of the remote control device 200 is transmitted to the display device. The display device may calculate the coordinates of the pointer 205 based on information on the movement of the remote control device 200. The display device may display the pointer 205 to correspond to the calculated coordinates.

In (c) of FIG. 4A, it is illustrated that a user moves the remote control device 200 away from the display unit 180 while pressing a specific button in the remote control device 200. Accordingly, a selected region in the display unit 180 corresponding to the pointer 205 may be zoomed in and displayed to be enlarged. Conversely, when the user moves the remote control device 200 close to the display unit 180, the selected region in the display unit 180 corresponding to the pointer 205 may be zoomed out and displayed to be reduced. On the other hand, when the remote control device 200 moves away from the display unit 180, the selected region may be zoomed out, and when the remote control device 200 moves close to the display unit 180, the selected region may be zoomed in.

Meanwhile, in a state in which a specific button in the remote control device 200 is being pressed, recognition of up, down, left, or right movements may be excluded. That is, when the remote control device 200 moves away from or close to the display unit 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Figure 4B:
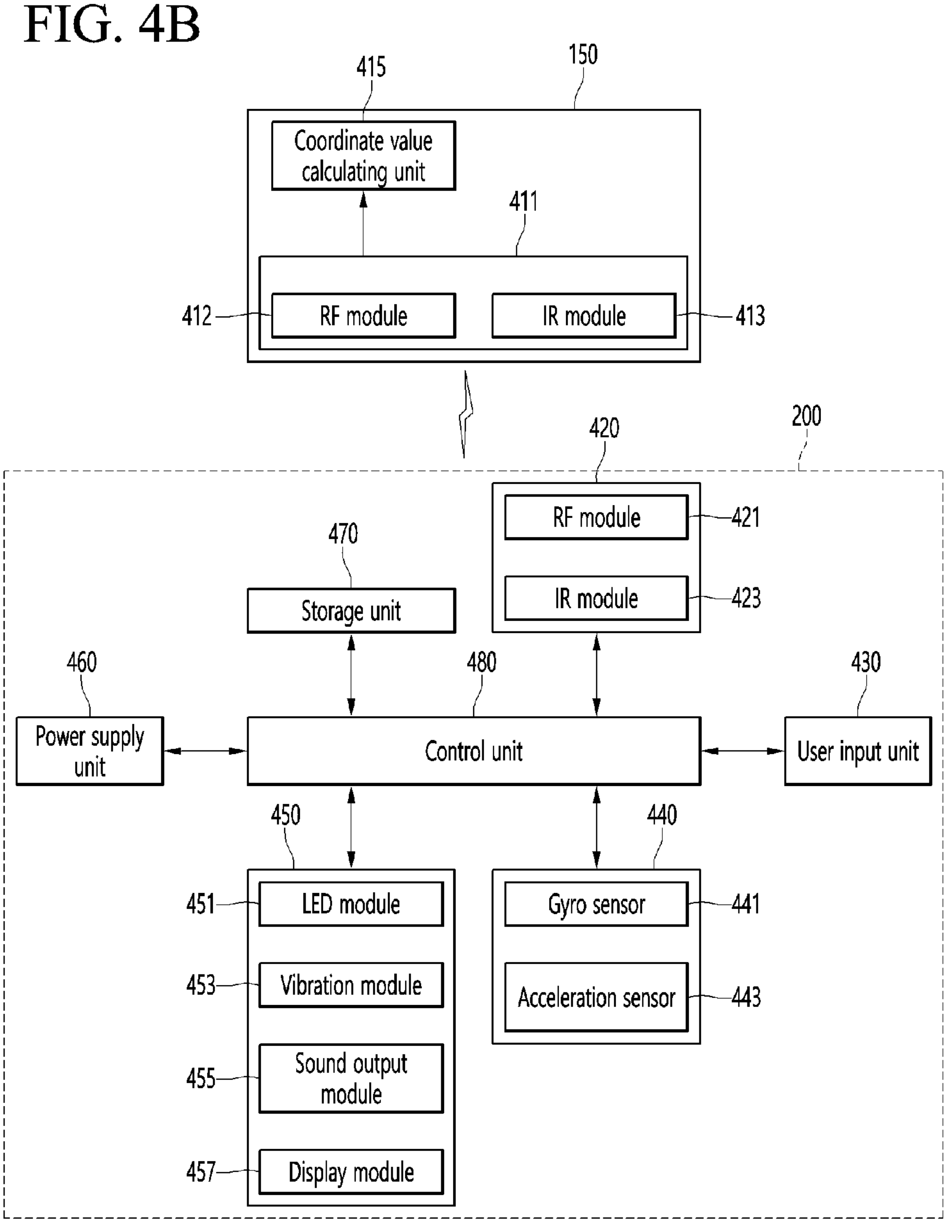
FIG. 4B is an internal block diagram of the remote control device of FIG. 2.

FIG. 4B is an internal block diagram of the remote control device of FIG. 2.

Referring to the drawing, the remote control device 200 may include a wireless communication unit 420, a user input unit 430, a sensor unit 440, an output unit 450, a power supply unit 460, a storage unit 470, ad a control unit 480.

The wireless communication unit 420 may transmit and receive signals to and from any one of the display devices according to the embodiments of the present disclosure described above. Among the display devices according to embodiments of the present disclosure, one display device 100 will be described as an example.

In the present embodiment, the remote control device 200 may include an RF module 421 capable of transmitting and receiving signals to and from the display device 100 according to the RF communication standard. In addition, the remote control device 200 may include an IR module 423 capable of transmitting and receiving signals to and from the display device 100 according to the IR communication standard.

In the present embodiment, the remote control device 200 transmits a signal containing information on the movement of the remote control device 200 to the display device 100 through the RF module 421.

Also, the remote control device 200 may receive a signal transmitted by the display device 100 through the RF module 421. In addition, the remote control device 200 may transmit a command regarding power on/off, channel change, volume adjustment, or the like to the display device 100 through the IR module 423 as necessary.

The user input unit 430 may include a keypad, a button, a touch pad, or a touch screen. The user may input a command related to the display device 100 to the remote control device 200 by operating the user input unit 430. When the user input unit 430 includes a hard key button, the user may input a command related to the display device 100 to the remote control device 200 through a push operation of the hard key button. When the user input unit 430 includes a touch screen, the user may input a command related to the display device 100 to the remote control device 200 by touching a soft key of the touch screen. In addition, the user input unit 430 may include various types of input means that may be operated by a user, such as a scroll key or a jog key, and the present embodiment does not limit the scope of the present disclosure.

The sensor unit 440 may include a gyro sensor 441 or an acceleration sensor 443. The gyro sensor 441 may sense information on the movement of the remote control device 200.

For example, the gyro sensor 441 may sense information on the operation of the remote control device 200 based on the x, y, and z axes. The acceleration sensor 443 may sense information on the movement speed of the remote control device 200 and the like. Meanwhile, a distance measurement sensor may be further provided, whereby a distance to the display unit 180 may be sensed.

The output unit 450 may output a video or audio signal corresponding to the operation of the user input unit 430 or a signal transmitted from the display device 100. The user may recognize whether the user input unit 430 is operated or whether the display device 100 is controlled through the output unit 450.

For example, the output unit 450 may include an LED module 451 that emits light, a vibration module 453 that generates vibration, a sound output module 455 that outputs sound, or a display module 457 that outputs a video when the user input unit 430 is operated or a signal is transmitted and received through the wireless communication unit 420.

The power supply unit 460 supplies power to the remote control device 200. The power supply unit 460 may reduce power consumption by stopping power supply when the remote control device 200 has not moved for a predetermined time. The power supply unit 460 may restart power supply when a predetermined key provided in the remote control device 200 is operated.

The storage unit 470 may store various types of programs and application data required for control or operation of the remote control device 200. When the remote control device 200 transmits and receives signals wirelessly through the display device 100 and the RF module 421, the remote control device 200 and the display device 100 transmit and receive signals through a predetermined frequency band. The control unit 480 of the remote control device 200 may store and refer to information on a frequency band capable of wirelessly transmitting and receiving signals to and from the display device 100 paired with the remote control device 200 in the storage unit 470.

The control unit 480 may control all matters related to the control of the remote control device 200. The control unit 480 may transmit a signal corresponding to a predetermined key operation of the user input unit 430 or a signal corresponding to the movement of the remote control device 200 sensed by the sensor unit 440 through the wireless communication unit 420.

The user input interface unit 150 of the display device 100 may include a wireless communication unit 411 capable of wirelessly transmitting and receiving signals to and from the remote control device 200, and a coordinate value calculating unit 415 capable of calculating coordinate values of a pointer corresponding to the operation of the remote control device 200.

The user input interface unit 150 may transmit and receive signals wirelessly to and from the remote control device 200 through the RF module 412. In addition, signals transmitted by the remote control device 200 according to the IR communication standard may be received through the IR module 413.

The coordinate value calculating unit 415 may correct a hand shake or an error based on a signal corresponding to the operation of the remote control device 200 received through the wireless communication unit 411, and calculate the coordinate values (x, y) of the pointer 205 to be displayed on the display unit 180.

The transmission signal of the remote control device 200 input to the display device 100 through the user input interface unit 150 may be transmitted to the control unit 170 of the display device 100. The control unit 170 may determine information on the operation and key operation of the remote control device 200 based on the signal transmitted by the remote control device 200, and control the display device 100 in response thereto.

As another example, the remote control device 200 may calculate pointer coordinate values corresponding to the operation and output the same to the user input interface unit 150 of the display device 100. In this case, the user input interface unit 150 of the display device 100 may transmit information on the received pointer coordinate values to the control unit 170 without a separate process of correcting a hand shake or error.

In addition, as another example, the coordinate value calculating unit 415 may be provided in the control unit 170 instead of the user input interface unit 150 unlike the drawing.

Figure 5:
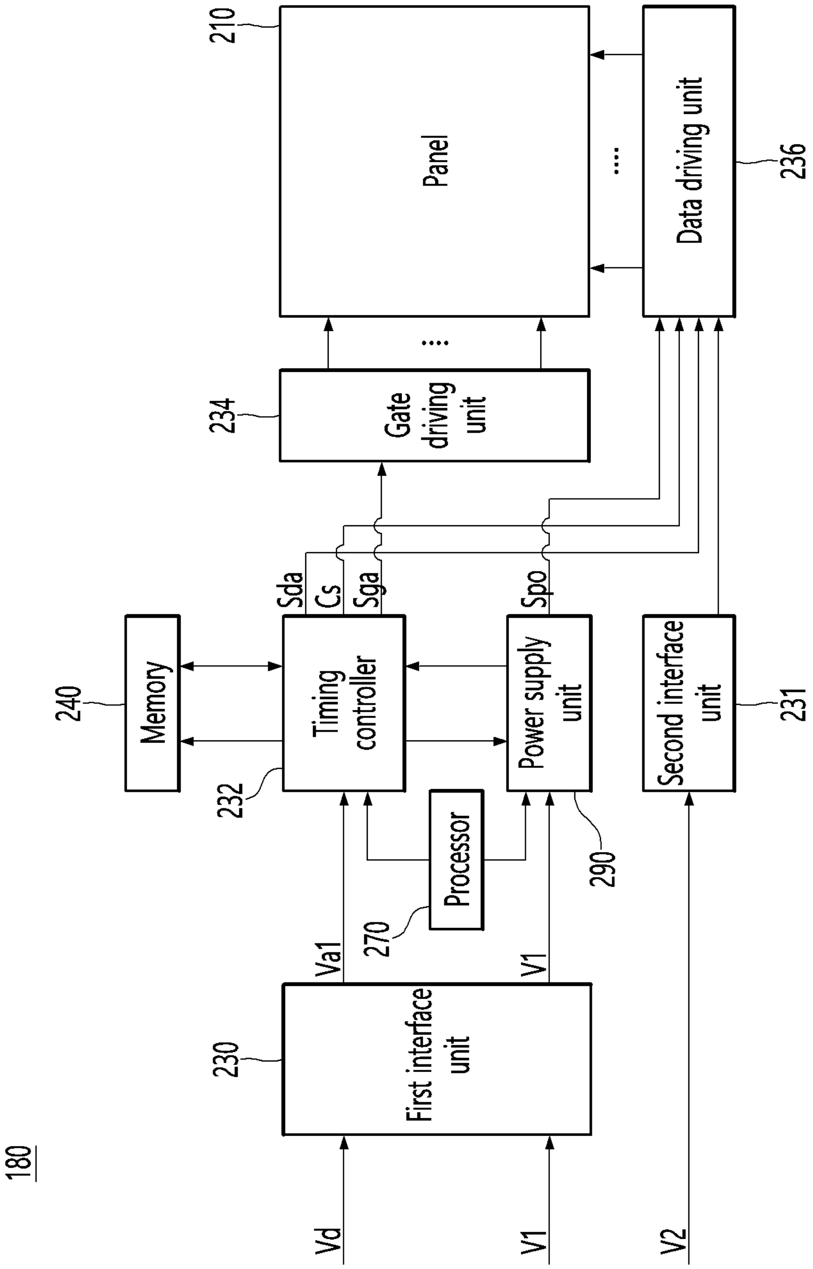
FIG. 5 is an internal block diagram of a display unit of FIG. 2.

FIG. 5 is an internal block diagram of the display unit of FIG. 2.

Referring to the drawing, the display unit 180 based on an organic light emitting panel may include a panel 210, a first interface unit 230, a second interface unit 231, a timing controller 232, a gate driving unit 234, a data driving unit 236, a memory 240, a processor 270, a power supply unit 290, and the like.

The display unit 180 may receive a video signal Vd, first DC power V1, and second DC power V2, and display a predetermined video based on the video signal Vd.

Meanwhile, the first interface unit 230 in the display unit 180 may receive the video signal Vd and the first DC power V1 from the control unit 170.

Here, the first DC power supply V1 may be used for the operation of the power supply unit 290 and the timing controller 232 in the display unit 180.

Next, the second interface unit 231 may receive the second DC power V2 from the external power supply unit 190. Meanwhile, the second DC power V2 may be input to the data driving unit 236 in the display unit 180.

The timing controller 232 may output a data driving signal Sda and a gate driving signal Sga based on the video signal Vd.

For example, when the first interface unit 230 converts the input video signal Vd and outputs the converted video signal va1, the timing controller 232 may output the data driving signal Sda and the gate driving signal Sga based on the converted video signal va1.

The timing controller 232 may further receive a control signal, a vertical synchronization signal Vsync, and the like, in addition to the video signal Vd from the control unit 170.

In addition, the timing controller 232 may output the gate driving signal Sga for the operation of the gate driving unit 234 and the data driving signal Sda for operation of the data driving unit 236 based on a control signal, the vertical synchronization signal Vsync, and the like, in addition to the video signal Vd.

In this case, the data driving signal Sda may be a data driving signal for driving of RGBW subpixels when the panel 210 includes the RGBW subpixels.

Meanwhile, the timing controller 232 may further output the control signal Cs to the gate driving unit 234.

The gate driving unit 234 and the data driving unit 236 may supply a scan signal and the video signal to the panel 210 through a gate line GL and a data line DL, respectively, according to the gate driving signal Sga and the data driving signal Sda from the timing controller 232. Accordingly, the panel 210 may display a predetermined video.

Meanwhile, the panel 210 may include an organic light emitting layer and may be arranged such that a plurality of gate lines GL intersect a plurality of data lines DL in a matrix form in each pixel corresponding to the organic light emitting layer to display a video.

Meanwhile, the data driving unit 236 may output a data signal to the panel 210 based on the second DC power supply V2 from the second interface unit 231.

The power supply unit 290 may supply various levels of power to the gate driving unit 234, the data driving unit 236, the timing controller 232, and the like.

The processor 270 may perform various control of the display unit 180. For example, the gate driving unit 234, the data driving unit 236, the timing controller 232 or the like may be controlled.

Figure 6A:
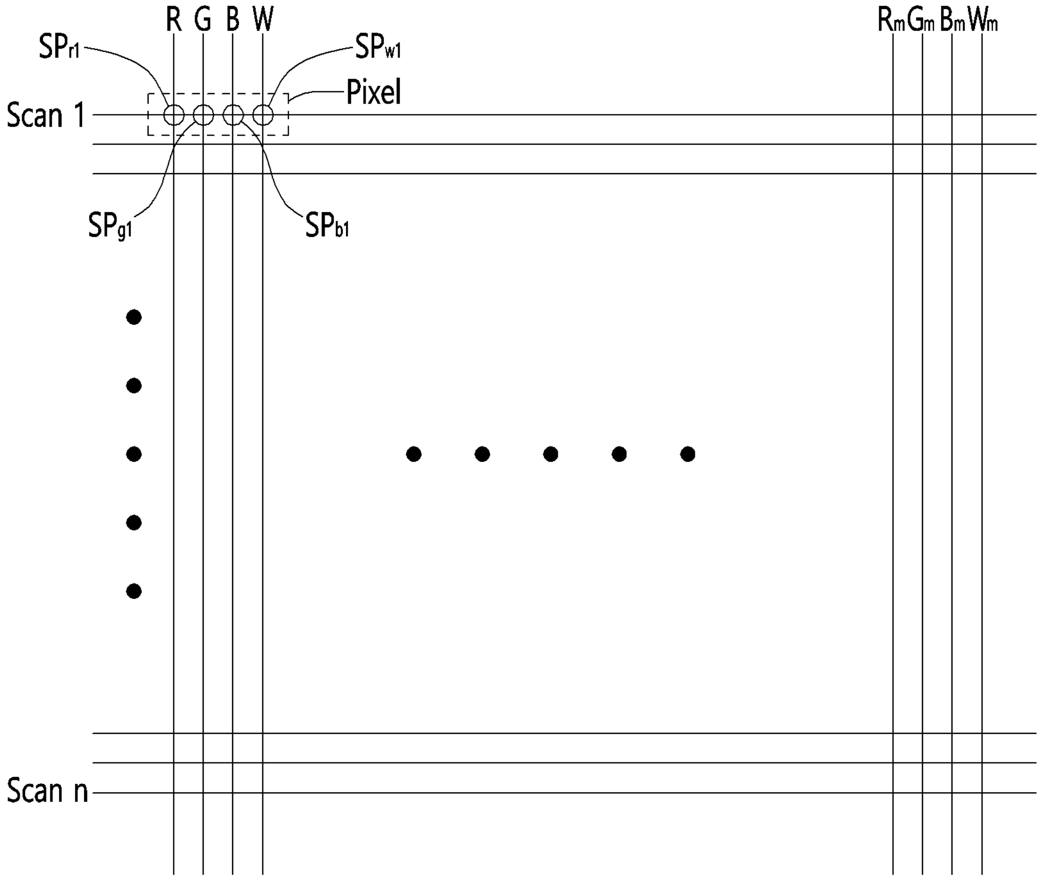
FIGS. 6A to 6B are views referred to for description of an organic light emitting panel of FIG. 5.
Figure 6B:
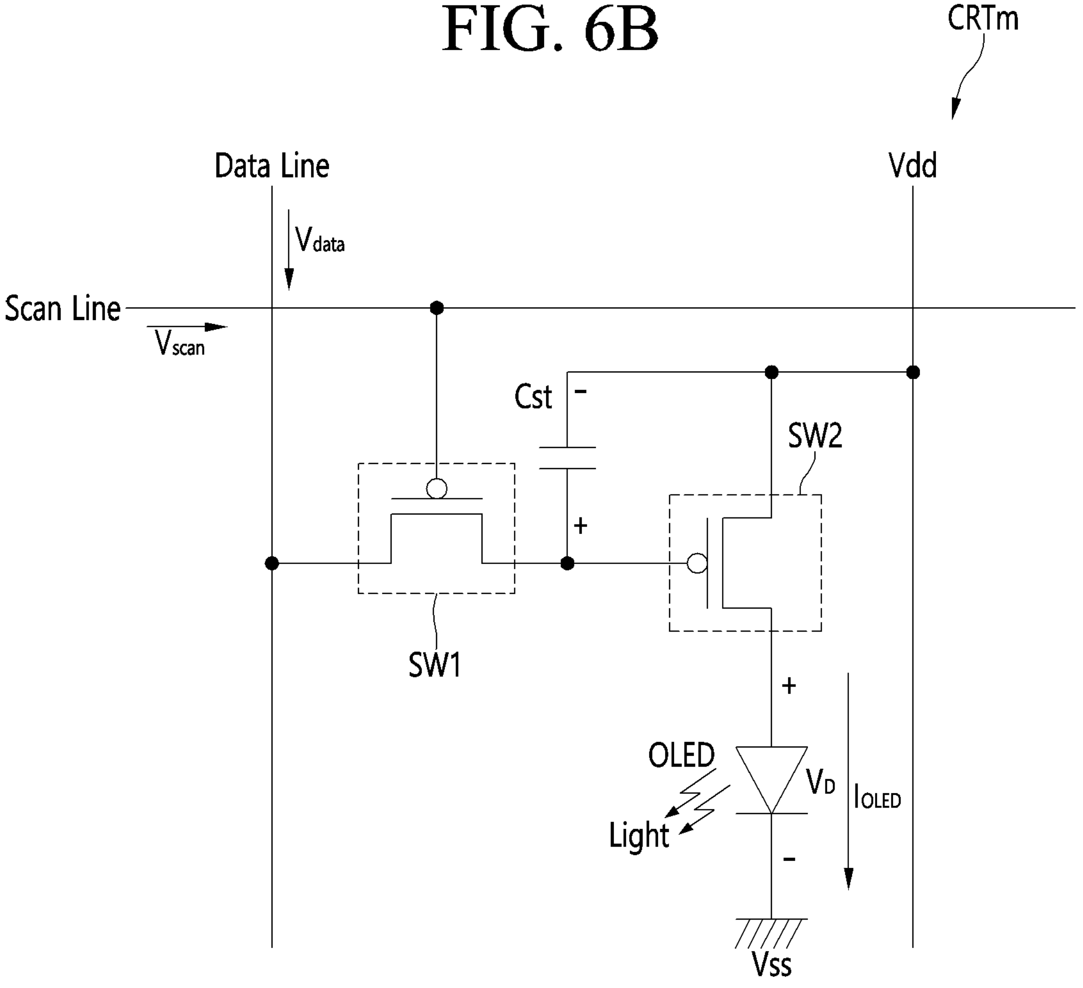

FIGS. 6A to 6B are views referred to for description of the organic light emitting panel of FIG. 5.

First, FIG. 6A is a diagram showing a pixel in the panel 210. The panel 210 may be an organic light emitting panel.

Referring to the drawing, the panel 210 may include a plurality of scan lines (Scan 1 to Scan n) and a plurality of data lines (R1, G1, B1, W1 to Rm, Gm, Bm and Wm) intersecting the scan lines.

Meanwhile, a pixel is defined at an intersection region of the scan lines and the data lines in the panel 210. In the drawing, a pixel having RGBW sub-pixels SPr1, SPg1, SPb1, and SPw1 is shown.

In FIG. 6A, although it is illustrated that the RGBW sub-pixels are provided in one pixel, RGB subpixels may be provided in one pixel. That is, it is not limited to the element arrangement method of a pixel.

FIG. 6B illustrates a circuit of a sub pixel in a pixel of the organic light emitting panel of FIG. 6A.

Referring to the drawing, an organic light emitting subpixel circuit CRTm may include a scan switching element SW1, a storage capacitor Cst, a driving switching element SW2, and an organic light emitting layer OLED, as active elements.

The scan switching element SW1 may be connected to a scan line at a gate terminal and may be turned on according to a scan signal Vscan, which is input. When the scan switching element SW1 is turned on, the input data signal Vdata may be transferred to the gate terminal of the driving switching element SW2 or one terminal of the storage capacitor Cst.

The storage capacitor Cst may be formed between the gate terminal and the source terminal of the driving switching element SW2, and store a predetermined difference between the level of a data signal transmitted to one terminal of the storage capacitor Cst and the level of the DC power Vdd transferred to the other terminal of the storage capacitor Cst.

For example, when the data signals have different levels according to a Pulse Amplitude Modulation (PAM) method, the level of power stored in the storage capacitor Cst may vary according to a difference in the level of the data signal Vdata.

As another example, when the data signals have different pulse widths according to the Pulse Width Modulation (PWM) method, the level of the power stored in the storage capacitor Cst may vary according to a difference in the pulse width of the data signal Vdata.

The driving switching element SW2 may be turned on according to the level of the power stored in the storage capacitor Cst. When the driving switching element SW2 is turned on, a driving current IOLED, which is proportional to the level of the stored power, flows through the organic light emitting layer OLED. Accordingly, the organic light emitting layer OLED may perform a light emitting operation.

The organic light emitting layer (OLED) includes a light emitting layer (EML) of RGBW corresponding to a subpixel, and may include at least one of a hole injection layer (HIL), a hole transport layer (HTL), an electron transport layer (ETL), and an electron injection layer (EIL) and may further include a hole blocking layer.

On the other hand, the sub pixels may emit white light in the organic light emitting layer (OLED) but, in the case of green, red, blue sub-pixels, a separate color filter is provided for realization of color. That is, in the case of green, red, and blue subpixels, green, red, and blue color filters are further provided, respectively. Meanwhile, since a white sub-pixel emits white light, a separate color filter is unnecessary.

On the other hand, although p-type MOSFETs are illustrated as the scan switching element SW1 and the driving switching element SW2 in the drawing, n-type MOSFETs or other switching elements such as JFETs, IGBTs, or SICs may be used.

Figure 7:
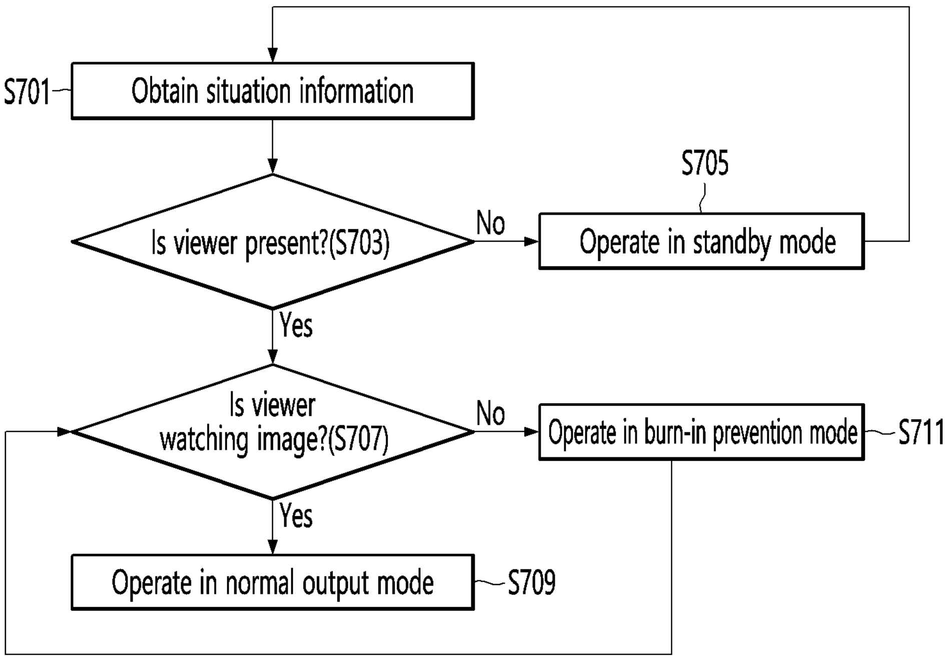
FIG. 7 is a flowchart for describing an operating method of a display device according to an embodiment of the present disclosure.

FIG. 7 is a flowchart for describing an operating method of the display device according to an embodiment of the present disclosure.

Hereinafter, the image output mode of the display unit 180 may include a normal output mode, a burn-in prevention mode, and a standby mode.

The normal output mode may be a mode in which the plurality of pixels constituting the panel 210 of the display unit 180 output light in a normal state.

The burn-in prevention mode may be a mode for outputting a luminance less than a luminance output in the normal output mode. That is, the burn-in prevention mode may be a mode for improving burn-in by outputting an image having a reduced quality, compared with the normal output mode when outputting an image.

The standby mode may be a sleep mode in which only minimum power is supplied to the display unit 180. In the standby mode, the display unit 180 may output a black image or output a standby screen.

Hereinafter, it is assumed that the display device 100 displays content on the display unit 180. The content may be an image or non-fungible token (NFT) content.

NFT may refer to a virtual asset that cannot replace a blockchain token with other tokens. NFT is used as a means for recording the copyright and ownership of digital assets such as games and artworks in a blockchain-based distributed network.

The control unit 170 of the display device 100 obtains situation information (S701).

According to an embodiment, the situation information may include one or more of information about the presence or absence of a user, a use time of the display panel 210, and surrounding environment information.

The control unit 170 may obtain information about the presence or absence of a viewer through various sensors such as an infrared sensor, a distance sensor, and a camera.

The control unit 170 may obtain the use time of each of the plurality of pixels constituting the display panel 210. The control unit 170 may calculate a cumulative current flowing through each pixel, and obtain the use time of the pixel based on the cumulative current. The control unit 170 may determine that the use time of the corresponding pixel is long as the amount of cumulative current increases, and may determine that the use time of the pixel is short as the amount of cumulative current decreases.

The control unit 170 may store, in the memory 240, a corresponding relationship between the cumulative current flowing through the pixel and the use time.

The control unit 170 determines whether the viewer is present in front of the display unit 180, based on the obtained situation information (S703).

The display device 100 may include an infrared sensor (not shown), a distance sensor (not shown), and a camera (not shown).

The control unit 170 may obtain information about whether the viewer is present in front of the display unit 180 by using at least one of the infrared sensor, the distance sensor, or the camera.

For example, the infrared sensor may irradiate infrared light to the outside and detect an object based on reflected infrared light.

The control unit 170 may determine the shape of the object detected from the reflected infrared light. When the determined shape is a human shape, the control unit 170 may determine that the viewer is present.

In another embodiment, the control unit 170 may determine whether the viewer is present, based on an image captured by the camera. When the captured image includes a viewer face image, the control unit 170 may determine that the viewer is present.

In still further embodiment, only when the viewer is within a preset distance from the display device 100, the control unit 170 may determine that the viewer is present in front of the display unit 180.

That is, only when the viewer is present in front of the display device 100 and is within a predetermined distance from the display device 100, the control unit 170 may determine the viewer's situation as an existing situation.

When the control unit 170 determines that the viewer is not present in front of the display unit 180, the control unit 170 operates the display unit 180 in the standby mode as the image output mode (S705).

When the control unit 170 determines that the viewer is not present in front of the display unit 180, the control unit 170 may change the image output mode to the standby mode in order to prevent power consumption.

In the standby mode, the display unit 180 may not output any image, or may display a standby screen corresponding to the minimum output of a plurality of pixels.

When the control unit 170 determines that the viewer is present in front of the display unit 180, the control unit 170 determines whether the viewer is watching an image being displayed on the display unit 180 (S707).

The control unit 170 may determine the image viewing state based on the viewer image obtained through the camera.

The control unit 170 may extract the viewer face image from the captured viewer image by using a known face recognition technology. The control unit 170 may extract an eye image from the extracted viewer face image, and obtain a viewer's gaze direction from the extracted eye image.

When the viewer's gaze direction faces the front of the display unit 180, the control unit 170 may determine that the viewer is watching an image.

When the viewer's gaze direction does not face the front of the display unit 180 for a predetermined time, the control unit 170 may determine that the viewer does not watch the image.

When the control unit 170 determines that the viewer watches the image, the control unit 170 operates the display unit 180 in the normal output mode as the image output mode (S709).

In an embodiment, in the normal output mode, the plurality of pixels constituting the display panel 210 may output light in the normal state for outputting an image.

When the control unit 170 determines that the viewer does not watch the image, the control unit 170 operates the display unit 180 in the burn-in prevention mode as the image output mode (S711).

The control unit 170 may change the image output mode to the burn-in prevention mode in order to prevent deterioration of the panel 210 of the display unit 180 in a situation in which the viewer does not watch the image.

That is, when the control unit 170 determines that the viewer does not watch the image, the control unit 170 may switch the image output mode from the normal output mode to the burn-in prevention mode.

The control unit 170 may control the operation of the panel 210 to adjust the luminance of the image in the burn-in prevention mode. The control unit 170 may control the operation of the panel 210 to output a second luminance that is less than a first luminance output in the image output mode.

To this end, the control unit 170 may perform control so that the current flowing through each of the plurality of pixels constituting the panel 210 is reduced.

The control unit 170 may sequentially turn on/off each of the plurality of pixels with a predetermined period in the burn-in prevention mode.

In an embodiment, in the burn-in prevention mode, the control unit 170 may turn on half of pixels among all the pixels constituting the panel 210 and may turn off the other half of the pixels.

In still further embodiment, in the burn-in prevention mode, the control unit 170 may sequentially turn on/off pixels, the use time of which is equal to or greater than a preset time, among all the pixels constituting the panel 210.

In the burn-in prevention mode, the control unit 170 may operate so that pixels, the use time of which is less than the preset time, output light in the normal state, and pixels, the use time of which is equal to or greater than the preset time, are sequentially turned on/off according to a predetermined period.

Figure 8:
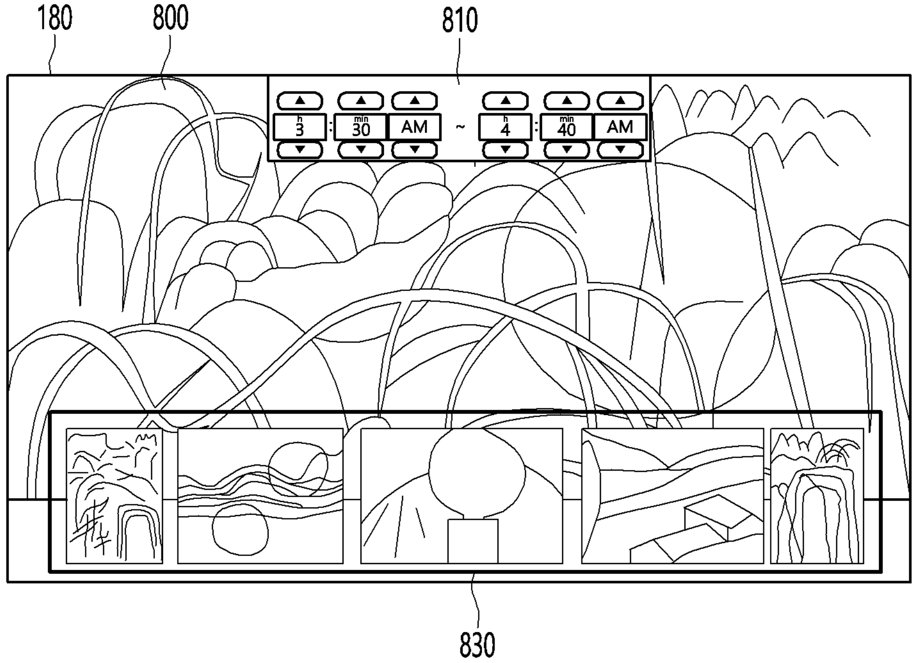
FIG. 8 is a diagram for describing a method for reproducing non-fungible token (NFT) content according to an embodiment of the present disclosure.

FIG. 8 is a diagram for describing a method for reproducing NFT content according to an embodiment of the present disclosure.

Referring to FIG. 8, the display unit 180 may reproduce NFT content 800.

The control unit 170 may display a reproduction setting window 810 for setting the reproduction of the NFT content 800.

The reproduction setting window 810 may be a window for setting a reproduction start time and a reproduction end time of the NFT content 800.

The user may freely set the reproduction start time and the reproduction end time of the NFT content 800, like an alarm setting, through the reproduction setting window 810.

Meanwhile, the control unit 170 may display an NFT possession list 830 including a plurality of NFT contents possessed by the user in the form of thumbnails on the display unit 180.

The user may purchase NFT through an NFT market and access information about the purchased NFT through a blockchain platform.

A plurality of NFT contents may be sequentially displayed on the display unit 180 in a slide manner.

According to the embodiment of FIG. 7, the control unit 170 may determine the image output mode of the display unit 180 based on the presence or absence of the viewer and the viewer's gaze direction when the viewer is present. The control unit 170 may output the NFT content 800 through the display unit 180 according to the determined image output mode.

In still further embodiment, when the image output mode is the normal output mode, the control unit 170 may adjust the brightness or luminance of the display unit 180 based on the ambient illuminance obtained through an illumination sensor (not shown). For example, when the measured ambient illuminance is greater than the luminance of the NFT content 800, the control unit 170 may control the display unit 180 to increase the output luminance of the NFT content 800.

Conversely, when the measured ambient illuminance is less than the luminance of the NFT content 800, the control unit 170 may control the display unit 180 to reduce the output luminance of the NFT content 800 with the ambient illuminance.

As described above, according to an embodiment of the present disclosure, the luminance of the content is adjusted to match the ambient illuminance of the display device 100 so that an optimal viewing environment is provided to the user.

Figures 9, 10:
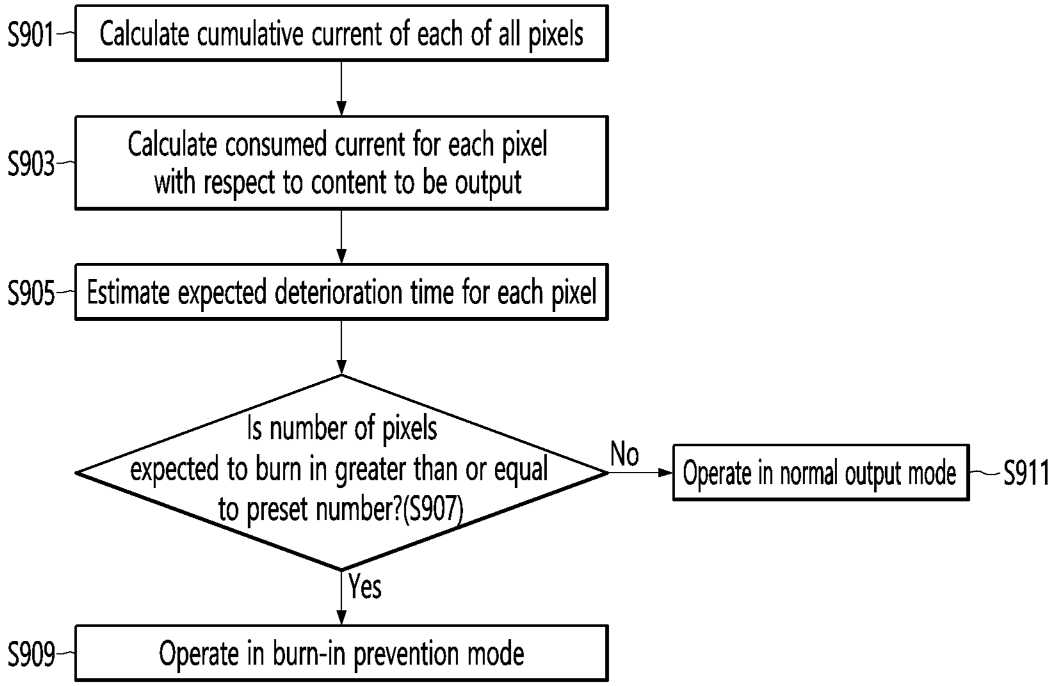
FIG. 9 is a flowchart for describing an operating method of a display device according to another embodiment of the present disclosure.
FIG. 10 is a diagram for describing a table matching a corresponding relationship between an RGB data set, which is a result of calculating the product of an RGB data value and a reproduction period of NFT content, and current consumption, according to an embodiment of the present disclosure.

FIG. 9 is a flowchart for describing an operating method of the display device according to another embodiment of the present disclosure.

Referring to FIG. 9, the control unit 170 of the display device 100 calculates the cumulative current of each of the pixels constituting the panel 210 (S901).

The control unit 170 may measure the amount of current supplied to each pixel from the past to the present, and may calculate the cumulative current of the pixel by multiplying the measured amount of current and the period during which the pixel is turned on.

A large cumulative current may mean a long use time of the pixel, and a small cumulative current may mean a short use time of the pixel.

The control unit 170 may store the cumulative current of each pixel in the memory 240. The control unit 170 may periodically store the cumulative current of each pixel in the memory 240.

The control unit 170 calculates the consumed current for each pixel with respect to the content to be output through the display unit 180 (S903).

The control unit 170 may calculate an expected consumed current to be consumed for each pixel by using information about the content output through the panel 210 of the display unit 180.

The information about the content may include an RGB data value of the NFT content for each pixel and a reproduction period of the NFT content.

As described above in the embodiment of FIG. 8, the reproduction period of the NFT content may be obtained through a user input that is input on the reproduction setting window 810.

Since the NFT content is a type of image, the RGB data value for each pixel may be fixed.

The control unit 170 may calculate the consumed current for each pixel by using the product of the RGB data value for each pixel and the reproduction period of the NFT content.

As the product of the RGB data value for each pixel and the reproduction period of the NFT content increases, the current consumption may increase. As the product of the RGB data value for each pixel and the reproduction period of the NFT content decreases, the current consumption may decrease.

The memory 240 may store a table matching a corresponding relationship between an RGB data set, which is a result of calculating the product of the RGB data value and the reproduction period of NFT content, and the current consumption.

FIG. 10 is a diagram for describing a table matching a corresponding relationship between an RGB data set, which is a result of calculating the product of the RGB data value and the reproduction period of NFT content, and the current consumption, according to an embodiment of the present disclosure.

Referring to FIG. 10, a table 1000 matching a corresponding relationship between an RGB data set, which is a result of calculating the product of the RGB data value and the reproduction period of NFT content, and the current consumption is shown.

The table 1000 may be stored in the memory 240 or the storage unit 140 of the display device 100.

The control unit 170 may calculate the product of the RGB data value of the pixel and the NFT reproduction period. The control unit 170 may read the consumed current corresponding to the calculated result value from the memory 240.

Again, FIG. 9 is described.

The control unit 170 estimates the expected deterioration time for each pixel based on the calculated consumed current for each pixel (S905).

The control unit 170 may estimate the expected deterioration time for each pixel based on the cumulative current of each pixel and the calculated consumed current.

The control unit 170 may sum the cumulative current and the consumed current of the pixel, and estimate the expected deterioration time of the pixel by using the cumulative estimated current that is the sum result.

The memory 240 may store a reference consumed current that causes burn-in of the pixel. The control unit 170 may estimate the expected deterioration time based on a difference between the cumulative estimated current and the reference consumed current.

As the difference between the cumulative estimated current and the reference consumed current is smaller, the expected deterioration time may be reduced, and as the difference between the cumulative estimated current and the reference consumed current is larger, the expected deterioration time may be increased.

The table indicating the corresponding relationship between the difference between the cumulative estimated current and the reference consumed current and the expected deterioration time may be stored in the memory 240.

Figures 11, 12:
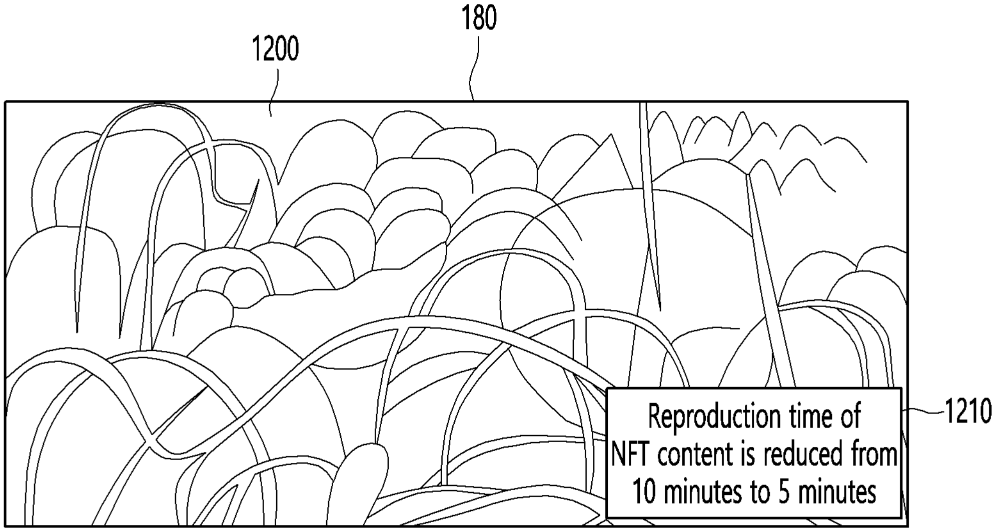
FIG. 11 is a diagram for describing a table showing a corresponding relationship between a difference between a cumulative estimated current and a reference current consumption and an expected deterioration time, according to an embodiment of the present disclosure.
FIG. 12 is a diagram for describing a pop-up window notifying that a reproduction time of NFT content is reduced in a burn-in prevention mode, according to an embodiment of the present disclosure.

FIG. 11 is a diagram for describing the table showing the corresponding relationship between the difference between the cumulative estimated current and the reference current consumption and the expected deterioration time, according to an embodiment of the present disclosure.

The table 1100 may be stored in the memory 240 or the storage unit 140 of the display device 100.

The control unit 170 may calculate the difference between the cumulative estimated current and the reference consumed current and may read, from the table 1100, the expected deterioration time of the pixel corresponding to the calculated difference.

When a value obtained by subtracting the cumulative estimated current from the reference consumed current is equal to or less than 0, the control unit 170 may determine the corresponding pixel as a burn-in target pixel for which burn-in is expected.

Again, FIG. 9 is described.

The control unit 170 determines whether the number of pixels expected to burn in based on the expected deterioration time for each pixel is greater than or equal to a preset number (S907).

When there is a pixel for which the expected deterioration time will arrive within the content reproduction period, the control unit 170 may select the corresponding pixel as a pixel for which burn-in is expected.

For example, when the content reproduction period is 5 hours and the expected deterioration time, which is the time when pixel deterioration occurs, arrives after 1 hour, the corresponding pixel may be determined as a pixel for which burn-in is expected.

When the number of pixels exceeding the expected burn-in time is equal to or greater than a preset number, the control unit 170 operates the display unit 180 in the burn-in prevention mode as the image output mode (S909).

The burn-in prevention mode may be a mode for outputting a luminance less than a luminance output in the normal output mode. That is, the burn-in prevention mode may be a mode for improving burn-in by outputting an image having a reduced quality, compared with the normal output mode when outputting an image.

The control unit 170 may control the operation of the panel 210 to adjust the luminance of the image in the burn-in prevention mode. The control unit 170 may control the operation of the panel 210 to output a second luminance that is less than a first luminance output in the image output mode.

To this end, the control unit 170 may perform control so that the current flowing through each of the plurality of pixels constituting the panel 210 is reduced.

The control unit 170 may sequentially turn on/off each of the entire pixels with a predetermined period in the burn-in prevention mode.

Alternatively, in the burn-in prevention mode, the control unit 170 may sequentially turn on/off each of the pixels in which burn-in is expected among all the pixels with a predetermined period.

In an embodiment, in the burn-in prevention mode, the control unit 170 may turn on half of pixels among all the pixels constituting the panel 210 and may turn off the other half of the pixels.

In still further embodiment, in the burn-in prevention mode, the control unit 170 may sequentially turn on/off pixels, the use time of which is equal to or greater than a preset time, among all the pixels constituting the panel 210.

In the burn-in prevention mode, the control unit 170 may operate so that pixels, the use time of which is less than the preset time, output light in the normal state, and pixels, the use time of which is equal to or greater than the preset time, are sequentially turned on/off according to a predetermined period.

When the number of pixels exceeding the expected burn-in time is less greater than a preset number, the control unit 170 operates the display unit 180 in the normal output mode as the image output mode (S911).

The normal output mode may be a mode in which the plurality of pixels constituting the panel 210 of the display unit 180 output light in a normal state.

FIG. 12 is a diagram for describing a pop-up window notifying that a reproduction time of NFT content is reduced in a burn-in prevention mode, according to an embodiment of the present disclosure.

Referring to FIG. 12, the display device 100 reproduces NFT content 1200 on the display unit 180.

When the image output mode is switched to the burn-in prevention mode, the display device 100 may display, on the display unit 180, a pop-up window 1210 notifying that an original reproduction time of the NFT content is changed to a reduced time.

The pop-up window 1210 may further include a text indicating a reduction in luminance of the NFT content.

In still further embodiment, when the image output mode is switched to the burn-in prevention mode, the display device 100 may display, on the display unit 180, a setting pop-up window (not shown) capable of changing and setting an original reproduction time of the NFT content to a reduced time.

The setting pop-up window may further include a text indicating a reduction in luminance of the NFT content.

As such, according to an embodiment of the present disclosure, burn-in of pixels during image reproduction may be efficiently prevented.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like, and may be implemented in the form of a carrier wave (for example, transmission through the Internet).

The display device described above is not limited to the configuration and method of the above-described embodiments, and the above embodiments may be configured by selectively combining all or some of embodiments such that various modifications may be made.

What is claimed is:

1. A display device comprising:

a display configured to display content corresponding to a non-fungible token (NFT) based asset for a set display time period, the display including a plurality of pixels each including an organic emission layer; and a processor configured to:

obtain a cumulative current of each of the plurality of pixels;

obtain an estimated consumed current for each of the plurality of pixels during the display time period of the content;

estimate an expected deterioration time of each of the plurality of pixels based on a difference between a reference consumed current and a sum of the cumulative current and the estimated consumed current;

estimate a number of pixels to burn-in during the display time period of the content based on the expected deterioration time of each of the plurality of pixels; and operate the display in reduced luminance image output mode based on the number of pixels expected to burn-in being greater than or equal to a first number.

2. The display device of claim 1, wherein the processor is further configured to sequentially control each of the plurality of pixels according to a first period while operating the display in the reduced luminance image output mode.

3. The display device of claim 1, wherein the processor is further configured to sequentially control each of the pixels that are expected to burn-in according to a first period while operating in the reduced luminance image output mode.

4. The display device of claim 1, wherein the processor is further configured to operate the display in a normal output mode based on the number of pixels that are expected to burn-in being less than the first number, and wherein a luminance output during operation in the normal output mode is greater than a luminance output during operation in the reduced luminance image output mode.

5. The display device of claim 1, wherein the display time period is set based on user input.

6. The display device of claim 1, wherein the processor is further configured to display, via the display, an indication that the display time period is reduced based on operation in the reduced luminance image output mode.

7. The display device of claim 1, wherein the processor is further configured to display, via the display, an interface allowing for reduction of the display time period based on operation in the reduced luminance image output mode.

8. A method of displaying content corresponding to a non-fungible token (NFT) based asset for a set display time period via a display device, the method comprising:

obtaining a cumulative current of each of a plurality of pixels of the display device;

obtaining an estimated consumed current for each of the plurality of pixels during the display time period of the content;

estimating an expected deterioration time of each of the plurality of pixels based on a difference between a reference consumed current and a sum of the cumulative current and the estimated consumed current;

estimating a number of pixels to burn-in during the display time period of the content based on the expected deterioration time of each of the plurality of pixels; and operating the display in reduced luminance image output mode based on the number of pixels expected to burn-in being greater than or equal to than a first number.

9. The method of claim 8, further comprising sequentially controlling each of the plurality of pixels according to a first period while operating the display in the reduced luminance image output mode.

10. The method of claim 8, further comprising sequentially controlling each of the pixels that are expected to burn-in according to a first period while operating in the reduced luminance image output mode.

11. The method of claim 8, further comprising operating the display in a normal output mode based on the number of pixels that are expected to burn-in being less than the first number, wherein a luminance output during operation in the normal output mode is greater than a luminance output during operation in the reduced luminance image output mode.

12. The method of claim 8, wherein the display time period is set based on user input.

13. The method of claim 8, further comprising displaying an indication that the display time period is reduced based on operation in the reduced luminance image output mode.

14. The method of claim 8, further comprising displaying an interface allowing for reduction of the display time period based on operation in the reduced luminance image output mode.

15. The display device of claim 1, wherein the processor is further configured to:

based on a determination of a pixel for which the expected deterioration time will arrive within the display time of the content, designate the pixel as a pixel for which burn-in is expected.

16. The display device of claim 1, wherein the processor is further configured to:

operate the display in the reduced luminance image output mode based on a determination that a viewer is present in front of the display and the viewer does not watch the content.

17. The method of claim 8, further comprising:

based on a determination of a pixel for which the expected deterioration time will arrive within the display time of the content, designate the pixel as a pixel for which burn-in is expected.

18. The method of claim 8, further comprising:

operating the display in the reduced luminance image output mode based on a determination that a viewer is present in front of the display and the viewer does not watch the content.

* * * * *